United States Patent [19]

Solomon

[11] 4,382,875
[45] May 10, 1983

[54] EXTRACTION TREATMENT

[75] Inventor: Frank Solomon, Greak Neck, N.Y.

[73] Assignee: Diamond Shamrock Corporation, Dallas, Tex.

[21] Appl. No.: 364,009

[22] Filed: Mar. 31, 1982

Related U.S. Application Data

[62] Division of Ser. No. 202,584, Oct. 31, 1980, Pat. No. 4,338,181.

[51] Int. Cl.$^3$ .................... C25B 11/02; H01M 4/88; C04B 35/00
[52] U.S. Cl. ........................ 252/425.3; 204/294; 264/104; 264/105; 429/42; 429/44; 429/45
[58] Field of Search ................ 252/425.3; 204/294; 429/42, 44, 45; 264/104, 105

[56] References Cited

U.S. PATENT DOCUMENTS 3,411,954  11/1968  Richman .................... 252/425.3

Primary Examiner—F. Edmundson
Attorney, Agent, or Firm—Woodrow W. Ban; John P. Hazzard

[57] ABSTRACT

This disclosure is directed to a process for extracting PTFE-wetting agent from PTFE particles containing small amounts of wetting agent in admixture with carbon particles comprising contacting said mixture with an organic liquid medium capable of extracting said wetting agent, and electrodes containing such extracted mixes. Also disclosed is a process for forming an electrode layer by depositing a soluble salt on a filter medium, depositing electrode layer material on said salt consolidating said electrode material and thereafter dissolving said salt.

1 Claim, No Drawings

EXTRACTION TREATMENT

This is a division of application Ser. No. 202,584, filed Oct. 31, 1980, now U.S. Pat. No. 4,338,181.

BACKGROUND OF THE INVENTION

Within the field of electrochemistry, there is a well-known electrolytic cell called a chlor-alkali cell. Such cells are divided by a separator into anode and cathode compartments. The separator characteristically can be a substantially hydraulically impermeable membrane, e.g., a hydraulically impermeable cation exchange membrane such as the commercially available NAFION manufactured by the E. I. du Pont de Nemours & Company. Alternatively, the separator can be a porous diaphragm, e.g, asbestos, which can be in the form of vacuum deposited fibers or asbestos paper sheet as are well known in the art. The anode can be a valve metal, e.g., titanium, provided with a noble metal coating to yield what is known in the art as a dimensionally stable anode.

In this cell, an electric current is passed through a concentrated brine (sodium chloride) aqueous solution to produce chlorine gas and caustic soda (sodium hydroxide) by electrolytic dissociation of the sodium chloride in water. An unwanted by-product of this reaction is production of hydrogen gas at the cathode of the chlor-alkali cell. It has been estimated that as much as 25 percent of the electrical energy needed to operate chlor-alkali cells is consumed by the formation of hydrogen gas at the cell cathode.

Among various attempts to reduce this electric power loss have been the development of the so-called oxygen (air) cathodes, which cathodes eliminate the formation of hydrogen at the cathode by instead reducing oxygen to form hydroxyl ions. The reduction of oxygen instead of the formation of the by-product hydrogen requires less electric power. Hence, it can be seen that electric power savings of as much as 25 percent can be achieved in the operation of the chlor-alkali cells by eliminating the formation of hydrogen at the cathode.

Characteristically, the oxygen (air) cathodes contain catalyst particles such as precious metal particles; or they can contain carbon particles, e.g., active carbon, having a high internal porosity, carbon black, graphite, etc.; or they can contain such carbon particles containing precious metal catalyst, e.g., silver, platinum, etc., deposited in and/or on said carbon particles. The presence of the precious metal in conjunction with the carbon enhances the activity of the carbon to form hydroxyl ions from the oxygen supplied at the cathode in the chlor-alkali cell.

One of the problems encountered with the use of active carbon particles is the corrosive nature of the catholyte, caustic soda, which tends to wet (flood) the pores of the active carbon and in essence restrict or lessen its desired activity. Since oxygen has a very low solubility in the electrolyte employed in the chlor-alkali cell, if the electrolyte fills all of the pores of the active carbon layer, the oxygen cathode is no longer capable of functioning to produce its desired results. Therefore, various materials have been employed in conjunction with active carbon in the active layer of the oxygen (air) cathode in an attempt to avoid the electrolytes wetting or filling the pores of the active carbon particles. Polytetrafluoroethylene (PTFE) and other fluorinated polymers have been employed to impart hydrophobicity to the active layer, per se, and/or to a protective or backing sheet which is laminated or otherwise attached to the active layer, or both to the active layer and the protective or backing sheet attached thereto.

It is known that in order to prepare the polytetrafluoroethylene in stable dispersion form wherein the PTFE particles account for about 60 percent solids content of the aqueous dispersion and have particle sizes ranging from about 0.05 to 0.5 microns with an average particle size of approximately 0.2 micron having a preponderant distribution leaning towards the smaller particle sizes, it is necessary to employ a wetting agent in the manufacture of these dispersions. The wetting agent primarily used in manufacturing the PTFE dispersions useful in accordance with this invention is "Triton X100" which is an anhydrous biodegradable liquid having 100 percent activity as a nonionic surface active agent. This material is water-soluble and is comprised of isooctyl phenoxy polyethoxy ethanol containing 10 moles of ethylene oxide. It is known in the art that this material is soluble in chloroform.

Some efforts have been made to remove the wetting agent by heat treating in air at elevated temperatures, e.g., 275° C. and above. However, such procedures often result in unwanted residue. Heat treating in inert atmosphere at such elevated temperatures is unavailing for removal of such wetting agents. Moreover, heat treating in air can cause combustion (burning) of the active carbon which is undesirable.

In the operation of chlor-alkali cells, e.g., using oxygen (air) cathodes having carbon and PTFE present therein, there has been a trend to increase the current density at which the chlor-alkali cell operates. The purpose of increasing current density is to increase the productivity of the cell, thus reducing the number of cells required to produce a given amount of chlorine and caustic. This substantially reduces the capital cost of a chlor-alkali plant. Moreover, the use of such high current densities, i.e., 300 plus milliamps per $cm^2$, is increasing in battery applications, e.g., in aluminum air batteries.

DESCRIPTION OF THE INVENTION

This invention is directed to a process whose use results in improvements in the electrode voltage of an electrode containing a coherent, self-sustaining active layer capable of operation at extremely high current density, e.g., 500 milliamperes $cm^{-2}$, and comprising from about 60 to about 90 weight percent of highly porous, preferably deashed active carbon particles having an average particle size ranging from about 1 to about 30 microns and from about 10 to about 40 weight percent of PTFE particles having an average particle size ranging from about 0.05 to about 0.5 micron.

Prior to conducting the process of this invention, the active carbon particles are preferably deashed (conditioned) by the method described and claimed in U.S. patent application Ser. No. 202,580, filed in the name of Frank Solomon of even date herewith and entitled "Active Carbon Conditioning Process." The disclosure of this application is incorporated herein by reference.

This deashing procedure involves separately contacting the active carbon particles with an alkali at elevated temperatures and with an acid at ambient temperatures and results in active carbon particles of increased surface area and reduced ash content, viz., usually having B.E.T. surface areas of 500 m²/g and higher and containing less than 4 weight percent ash.

Active carbon which can be used in accordance with this invention encompasses a variety of materials which, in general, encompass a variety of amorphous carbonaceous materials, generally of vegetable origin which contain inorganic residue, e.g., noncarbonaceous oxides collectively designed as ash.

In accordance with a preferred embodiment, the active carbon starting material is "RB" carbon which is a form of commercially available active carbon manufactured by Calgon, a division of Merck, and is made from bituminous coal by known procedures. This material can contain as much as approximately 23 percent of various oxides and components which can be collectively classified as ash. Typical analysis of the ash contained in RB carbon is as follows:

| Component | Weight Concentration |
| --- | --- |
| Silica | 43.34 |
| Alumina ($Al_2O_3$) | 29.11 |
| Iron Oxides ($Fe_2O_3$) | 20.73 |
| Others | 6.82 |

The deashing does not totally remove the ash content from the active carbon but results in a substantial reduction thereof, viz., from about 70 to 80 percent or more of the ash is removed by the process of this invention.

The initial stage of deashing constitutes contacting the active particles as obtained, e.g, RB carbon as mentioned above, with either an acid or an alkali followed by contact with the other. For example, during the base contacting stage, the alkali material, such as sodium hydroxide, potassium hydroxide, etc., is maintained at elevated temperatures ranging from about 90° to about 140° C. and several contacting steps are used over time periods of, e.g., 0.5 to 24 hours, followed by one or more intermittent water washing step(s).

Then the thus treated active carbon is contacted with an acid, such as hydrochloric acid, for similar extended time periods at ambient temperatures. Between the alkali and acid contacting phases, the active carbon particles can optionally be dried. However, drying is not required in accordance with this invention.

Usually, the alkali is employed in the form of an aqueous solution containing from 28 to 55, and more usually from 35 to 45 weight percent alkali based on total solution.

The acid content of the aqueous acid solution customarily ranges from 10 to 30 weight percent and more usually from 15 to 25 weight percent acid based on total solution.

Prior to contact with the alkali solution, it has been found desirable to first comminute, e.g., ball mill or otherwise divide up the active carbon particles as purchased. For example, RB active carbon was ball milled for 2 to 6 hours, and more usually approximately 4 hours to reduce its particle size to from about 5 microns to about 30 microns.

Usually the alkali washing stage is performed in several individual washing steps using a hot (100° to 130° C.) alkali solution. After the alkali washing has been completed, the alkali is neutralized using one or more water washing step(s) to remove the alkali prior to the acid wash stage.

Similarly, the acid washing stage can be accomplished in several discrete washing steps rather than all at one time. Additionally, the contact with acid can be accomplished at lower temperatures for longer periods of time. For example, the acid wash can be conducted overnight (approximately 16 hours) at room temperature. As with the alkali contact stage preferably after the acid contact, the active carbon particles are subjected to a water washing to remove the acid followed by drying. Alternatively, the acid stage can be conducted at elevated temperatures using a Soxhlet extraction constant reflux apparatus, e.g., using HCl, HBr, etc., at 110° to 130° C. for about 0.5 hr., viz., constant boiling mineral acids, each having its respective boiling range. While many acids may suitably be employed, the acid of choice is hydrochloric acid.

The sequential deashing or conditioning pretreatment results in substantial reduction of the aforementioned ash content of the active carbon particles. Typically, when utilizing active carbon having an initial B.E.T. surface area of 600 to 1500 m²/g (square meters per gram) of carbon and pretreating it with alkali and acid in accordance with this invention, reductions of ash content from about 12 weight percent to not more than about 4 weight percent have been accomplished.

The thus preferably deashed (conditioned) active carbon particles are now ready for conducting the process of this invention to improve the voltage properties of electrodes made from such active carbon particles.

This process is comprised of contacting an aqueous dispersion of PTFE with carbon particles (with or without an added precious metal deposited on and/or within the pores thereof) to form a PTFE/carbon mix; removing the liquid from the carbon-PTFE particulate mixture; drying said particulate mixture; chopping said dried particulate mixture; treating said chopped mixture with chloroform or other organic liquid capable of extracting (removing) the wetting agent used to disperse PTFE in water in the first instance (preferably in a Soxhlet extractor) and forming said extracted mixture into sheet form by passing the prepared carbon-PTFE mix through high pressure rollers to form a sheet(s). Less preferably, the chloroform extraction can be done on the formed sheet(s) or laminated oxygen cathodes incorporating such carbon-PTFE mix. Active layer sheets made from the extracted material have better voltage than untreated sheets when subjected to high current density, viz., about 300+ milliamperes cm$^{-2}$. By "better voltage" is meant less electrode polarization.

When it is desired to form ultra-thin active electrode layers, viz., those having an area density of less than about 15 milligrams cm$^{-2}$, a filtration sheet formation procedure can be employed. This procedure comprises preparing and extracting the active carbon-PTFE mix, described above, and preparing a salt-impregnated, e.g., sodium chloride, filter paper, or one having a bed of salt thereon. An alcohol dispersion of the active carbon-PTFE mix (previously extracted with chloroform and dried) is heated at about 100° C. and under light pressure to dry the wet layer formed on the filter paper. Then the filter paper is readily removed from the ultra-thin active layer by washing the filter paper with water, the water dissolving the salt to permit separation of the active layer from the filter paper. The active carbon-PTFE ultra-thin electrode is then dried.

The present invention is based upon a combination of discoveries, first that, in part, the voltage drop problem encountered in use of oxygen (air cathodes) is due the presence of small quantities of "Triton X100" wetting agent retained in the PTFE component of the active layer, and secondly that the wetting agent should be extracted by the contacting organic solvent with the "Teflonated" carbon particles, viz., the carbon particles which are intimately mixed with the PTFE particles.

According to a preferred embodiment of this invention, the chloroform extraction of the PTFE wetting agent is conducted on the "Teflonated" carbon particles before they are formed into a sheet. One advantage of this embodiment is that it enables continuous electrode manufacture versus batch type as would occur when the extraction is done on an already formed layer. This procedure is particularly preferred when making thin active layers for oxygen (air) cathodes. Characteristically, such thin active cathode layers contain less than about 25 milligrams of PTFE/carbon (with or without noble metal catalyst) per cm$^2$, viz., having an area density of PTFE/carbon of less than about 20 milligrams per cm$^2$.

The thus extracted material is then formed into a sheet. One method of doing this is by the salt bed filtration procedure. The alcohol dispersion of carbon-PTFE (previously extracted with chloroform) is then placed upon a salt (e.g., sodium chloride) impregnated filter medium, e.g., filter paper, or one having a bed of a soluble salt, preferably a water-soluble salt (e.g., sodium chloride) thereon and an alcohol dispersion of carbon-PTFE mix is filtered on the salt bed/filter paper. Uniform distribution is assured when a tall column of alcohol is above the filter and the mix is stirred in at the top. With very fine materials, the active electrode layer can be deposited upon the filter paper by sedimentation, filtration or a combination of the two. The wet electrode layer is then dried at about 100° C. and under light pressure to avoid mud-cracking. The filter paper is then separated from the newly formed layer using water to dissolve the salt and thus separate the layers. The carbon-PTFE layer is then removed from the filter paper and redried.

Another method of forming a sheet is to pass the chopped material between heated rollers.

It has been found that electrodes having active layers formed from "Teflonated" active carbon which has been extracted with chloroform have improved voltage, e.g., a voltage of −0.15 to −0.2 volt (measured against Hg/HgO), in cells operating at 300 plus milliamps/cm$^2$, e.g., 500 milliamps/cm$^2$, e.g., 500 milliamps/cm$^2$, of current versus a voltage of −0.26 to −0.36 volt without chloroform extraction. This extraction is preferably conducted in a Soxhlet-type extractor operated so as to boil and reflux the CHCl$_3$ through the carbon-PTFE mixture for time periods ranging from about 4 to 24 hours.

The present invention is applicable to PTFE mixes with any form of carbon, e.g., active carbon, carbon black, graphite, etc. The term carbon black as used herein is employed as defined in an article entitled "FUNDAMENTALS OF CARBON BLACK TECHNOLOGY" by Frank Spinelli appearing in the AMERICAN INK MAKER, August, 1970. Carbon black is a generic term referring to a family of industrial carbons which includes lamp blacks, channel blacks, furnace blacks and thermal blacks, e.g., acetylene carbon black. In general, carbon black is made by incomplete combustion or thermal decomposition of a liquid or gaseous hydrocarbon.

The invention will be illustrated in further detail in the examples which follow in which all parts, ratios and percents are by weight, unless otherwise indicated.

EXAMPLE 1

Commercially available "RB carbon" was found to have an ash content of approximately 12 percent as received. This "RB carbon" was treated in 38 percent KOH for 16 hours at 115° C. then washed several times with water and found to contain 5.6 percent ash content after a subsequent furnace operation. The alkali treated "RB carbon" was then treated (immersed) for 16 hours at room temperature in 1:1 aqueous hydrochloric acid (20 percent concentration) and washed several times with water. The resulting ash content had been reduced to 2.8 percent. "RB carbon," deashed as above, was platinized, provided with platinum catalyst in accordance with the procedure set forth and described in U.S. Pat. No. 4,044,193 using 200 grams per liter solution of H$_3$Pt(SO$_3$)$_2$OH solution as a source of platinum for the deashed active carbon. Sufficient platinum is applied to yield deashed "RB" active carbon having a ratio of 3 grams deashed "RB" active carbon per gram of platinum.

After platinizing, the active carbon was provided with a discontinuous coating of smaller adherent PTFE particles ("Teflonated") using du Pont "Teflon 30" aqueous dispersion and 80 percent platinized "RB" active carbon and 20 percent PTFE. The thus PTFE discontinuously coated active carbon particles were then washed with water, and it was noted that this water washing failed to remove wetting agent in as much as no sudsing occurred in the wash water.

After drying, this mix was chopped in a coffee blender, i.e., type Varco, Inc., Model 228 1.00 and extracted with chloroform (CHCl$_3$) in a Soxhlet apparatus for a 16-hour period overnight. Then it was rolled into sheet form by passing it between chrome plated steel rollers heated at about 65° to 90° C. using rollers set at a gap of approximately 0.008 inch to form an active layer sheet having an area density of approximately 20 milligrams per square centimeter and ready for fabrication into a laminated oxygen cathode.

Separately a conductive, hydrophobic wetproofing (backing) layer was made containing PTFE and carbon black in accordance with the procedure described and claimed in U.S. patent application Ser. No. 202,575, filed of even date herewith in the name of Frank Solomon and entitled "Electrode Backing Layer and Method of Preparing," the disclosure of which is incorporated herein by reference.

Basically, this procedure involves the preparation of cohesive, self-sustaining electrode backing layers by a method comprising mixing from 5 to 50 weight parts of polytetrafluoroethylene (PTFE) having a particle size ranging from 0.05 to 0.5 micron with from 95 to about 50 weight parts of carbon black of a particle size ranging from about 50 to about 3000 angstroms and a density of about 1.95 grams per cubic centimeter, to produce an electrode backing layer having enhanced electrical conductivity compared to backing layers made from PTFE alone.

The wetproofing layer was now ready for lamination.

The active layer prepared as described herein was then laminated to the PTFE-carbon black backing sheet prepared as described herein and to a silver-plated, symmetrical, nickel screen current distributor. The current distributor was a 0.005-inch diameter nickel woven wire mesh having a 0.0003-inch thick silver plating and a 50×50 woven strand arrangement, viz., 50 warp and 50 fill strands per inch. The distributor was positioned on one side of the backing sheet while the other side of the backing was placed on the active layer. The lamination was performed in a hydraulic press at 100° to 130° C. and using pressures of 1.5 to 8.5 tons per in² for 3 to 10 minutes.

The laminate was then placed in a test (half) cell for testing against an inert counter electrode and a Hg/HgO standard reference electrode in an electrolyte of 4 molar aqueous sodium hydroxide plus 2 molar $NaAlO_2$ at 60° C. with an air flow of 4 times the theoretical requirement for an air cathode and at the current density as tabulated below to yield the observed voltages.

TABLE 1

| Current Density (milliamps/cm²) | 40 | 300 | 500 |
|---|---|---|---|
| Voltage vs. Hg/HgO | .027 | .15 | .26 |

EXAMPLE 2

An oxygen (air) cathode was prepared in the same way as in Example 1 except that the chloroform extraction step was omitted on the chopped, "Teflonated" PTFE-active carbon. This laminated electrode was placed in a test cell as in Example 1 with the below-tabulated results.

TABLE 2

| Current Density (milliamps/cm²) | 40 | 300 | 500 |
|---|---|---|---|
| Voltage vs. Hg/HgO | .063 | .25 | electrode blistered and failed |

EXAMPLE 3

An oxygen (air) electrode was prepared as in Example 1 except that instead of rolling the active layer to sheet form, it was formed by filtration onto a NaCl salt bed on filter paper using the platinum-catalyzed Teflonated "RB" active carbon as in Example 1, and having an area density of 15 milligrams/cm². The filter cake was dried and pressed at 0.25 tons/in² and 110° C. to form the active layer, which was then laminated as in Example 1. This electrode was then tested as in Example 1 with the below-tabulated results.

TABLE 3

| Current Density (milliamps/cm²) | 40 | 300 | 500 |
|---|---|---|---|
| Voltage vs. Hg/HgO | .023 | .12 | .18 |

What is claimed is:
1. A process of forming an electrode layer comprising depositing a soluble salt on a filter medium, depositing electrode layer material on said salt, consolidating said material and thereafter dissolving said salt.

* * * * *